(12) United States Patent
Kato et al.

(10) Patent No.: US 10,452,721 B2
(45) Date of Patent: Oct. 22, 2019

(54) AUTOPOIETIC INFORMATION PROCESSING SYSTEM AND METHOD

(71) Applicant: HITACHI, LTD., Chiyoda-ku, Tokyo (JP)

(72) Inventors: Takeshi Kato, Tokyo (JP); Hiroyuki Mizuno, Tokyo (JP); Yasuyuki Kudo, Tokyo (JP); Masanao Yamaoka, Tokyo (JP); Junichi Miyakoshi, Tokyo (JP); Kouji Fukuda, Tokyo (JP); Yasuhiro Asa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 251 days.

(21) Appl. No.: 15/505,565

(22) PCT Filed: Aug. 22, 2014

(86) PCT No.: PCT/JP2014/072015
§ 371 (c)(1),
(2) Date: Feb. 21, 2017

(87) PCT Pub. No.: WO2016/027372
PCT Pub. Date: Feb. 25, 2016

(65) Prior Publication Data
US 2017/0270223 A1    Sep. 21, 2017

(51) Int. Cl.
*G06F 17/30* (2006.01)
*G06F 16/904* (2019.01)
(Continued)

(52) U.S. Cl.
CPC .............. *G06F 16/904* (2019.01); *G06F 7/14* (2013.01); *G06F 16/9024* (2019.01);
(Continued)

(58) Field of Classification Search
USPC .................................................. 707/722, 808
See application file for complete search history.

(56) References Cited

U.S. PATENT DOCUMENTS

2004/0243591 A1* 12/2004 Gu ..................... G06F 17/30592
2005/0065914 A1    3/2005 Chang et al.
2012/0023120 A1    1/2012 Kanefsky

FOREIGN PATENT DOCUMENTS

JP    2005-100392 A    4/2005
JP    2013-535729 A    9/2013

OTHER PUBLICATIONS

Minsky, M.; The Emotion Machine: Commonsense Thinking, Artificial Intelligence, and the Future of the Human Mind; Simon & Schuster; 2007; 400 p.
(Continued)

*Primary Examiner* — Hung T Vy
(74) *Attorney, Agent, or Firm* — Miles & Stockbridge, P.C.

(57) ABSTRACT

An autopoietic information processing system which is an information processing system for collecting and outputting information includes: a means that inputs first information; a means that collects second information related to the first information; a means that selects third information from the second information; a means that outputs second or third information; a means that collects the second information by setting the third information as new first information; a means that merges the existing second information and new second information at a predetermined rate; a means that selects new third information from the merged second information; and a means that outputs the merged second information or the new third information. The means are recursively operated to continuously provide new information which leads to awareness and discovery of a user.

15 Claims, 9 Drawing Sheets

(51) Int. Cl.
*G06F 16/901* (2019.01)
*G06F 16/9038* (2019.01)
*G06F 16/903* (2019.01)
*G06F 7/14* (2006.01)
*G06N 3/02* (2006.01)
*G06N 5/00* (2006.01)

(52) U.S. Cl.
CPC .... *G06F 16/9038* (2019.01); *G06F 16/90335* (2019.01); *G06N 3/02* (2013.01); *G06N 5/00* (2013.01)

(56) References Cited

OTHER PUBLICATIONS

Milner, R.; Turing, Computing and Communication; Interactive Computation The New Paradigm; D. Goldin, S. Smolka and P. Wegner ed.; Springer Berlin Heidelberg; 2006; pp. 1-8.

\* cited by examiner

| | EXISTING SECOND INFORMATION 220 | |
|---|---|---|
| A | a | A-B | Xab |
| B | b | A-C | Xac |
| C | c | A-D | Xad |
| D | d | A-E | Xae |
| E | e | A-G | Xag |
| F | f | A-J | Xaj |
| G | g | D-H | Xdh |
| H | h | E-F | Xef |
| .. | .. | .. | .. |
| .. | .. | .. | .. |

| | NEW SECOND INFORMATION 221 | |
|---|---|---|
| B | b' | B-K | Xbk' |
| K | k' | B-L | Xbl' |
| L | l' | A-B | Xab' |
| A | a' | B-M | Xbm' |
| E | e' | B-N | Xbn' |
| F | f' | A-D | Xad' |
| C | c' | A-C | Xac' |
| D | d' | A-E | Xae' |
| .. | .. | .. | .. |
| .. | .. | .. | .. |

| | MERGED SECOND INFORMATION 222 | |
|---|---|---|
| B | α·b+β·b' | B-K | α·Xbk+β·Xbk' |
| K | α·k+β·k' | A-B | α·Xab+β·Xab' |
| A | α·a+β·a' | B-L | α·Xbl+β·Xbl' |
| L | α·l+β·l' | A-E | α·Xae+β·Xae' |
| E | α·e+β·e' | A-C | α·Xac+β·Xac' |
| C | α·c+β·c' | A-D | α·Xad+β·Xad' |
| D | α·d+β·d' | A-G | α·Xag+β·Xag' |
| F | α·f+β·f' | B-N | α·Xbn+β·Xbn' |
| .. | .. | .. | .. |
| .. | .. | .. | .. |

AUTOPOIETIC INFORMATION PROCESSING SYSTEM AND METHOD

TECHNICAL FIELD

The present invention relates to an information processing system and an information processing method to collect and output information.

BACKGROUND ART

Following the first agricultural revolution, the second industrial revolution, and the third information revolution, which have brought significant changes in a human society, the fourth mind revolution is occurring. The information revolution has brought knowledge economy, and the mind revolution will develop experience economy which arouses sensitivity, intuition, and creativity of a human.

Along this trend, researches are carried out an artificial intelligence trying to realize a brain function and social computing connecting to a society. Minsky called a father of an artificial intelligence advocates a model that an interaction of a group of thinking elements (resources) creates a mind (NPTL 1). Milner who is a computer scientist advocates interactive computation by a continuous process by an active agent (NPTL 2).

To arouse intuition and creativity in a large-scale and complicated ever-changing human society, an information processing system in which concepts of an artificial intelligence and an interactive computation are pushed forward and which autonomously continuously provides new information to a user is needed, not an information processing system which answers information in a predetermined procedure to an issue set by a user in a conventional manner.

In an information processing system such as a general database system and a search system, there are techniques described in JP 2005-100392 A (PTL 1) and JP 2013-535729 A (PTL 2) to efficiently provide information to a user.

PTL 1 describes that "a processing efficiency can be improved by adding, to queries, new predicates regarding data attributes which are not included in original queries". PTL 2 describes that "a query proposal is proposed data which can be used to improve searching or to improve a search policy, and the query proposal is often used as additional queries".

CITATION LIST

Non-Patent Literature

NPL 1: M. Minsky. The Emotion Machine: Commonsense Thinking, Artificial Intelligence, and the Future of the Human Mind. Simon & Schuster, 2007, 400 p.
  (http://web.media.mit.edu/~minsky/eb7.html)
NPL 2: R. Milner. "Turing, Computing and Communication". Interactive Computation The New Paradigm. D. Goldin, S. Smolka and P. Wegner ed. Springer Berlin Heidelberg, 2006, p. 1-8.
  (http://www.fairdene.com/picalculus/milner-infomatics.pdf)

Patent Literatures

PTL 1: JP 2005-100392 A
PTL 2: JP 2013-535729 A

SUMMARY OF THE INVENTION

Technical Problem

In PTL 1 and PTL 2, additional queries support satisfying information needs required by a user. However, the additional queries are limited within a range of a data attribute in PTL 1, and the additional queries are limited to contents of a query log in PTL 2. Therefore, for example, even if queries are repeatedly added, information to be provided to a user becomes the same contents.

An object of the present invention is to continuously provide new information which leads to awareness and discovery by arousing intuition and creativity of a user.

Solution to Problem

To solve the above issue, a representative system among the autopoietic information processing systems according to the present invention is a system to collect information related to an input by a user, to collect information selected from the collected information as a new input, to merge the newly collected information and already collected information at a predetermined rate, and recursively operates information selected from the merged information as a new input.

The other aspect of the present invention is an information processing system which collects and outputs information. The information processing system is an autopoietic information processing system which includes: a means that inputs first information; a means that collects second information related to the first information; a means that selects third information from the second information; a means that collects new second information by setting the third information as new first information; a means that merges the second information and the new second information at a predetermined rate; and a means that selects new third information from the merged second information. The new third information is recursively operated as the latest first information.

In this case, the third information highly related to the first information is selected from the second information. Further, the third information can be contingently selected from the second information. It can be expected that different trend results can be obtained by changing a selecting method and adjusting a selecting ratio.

A means that selects the third information from the second information and a means that selects new third information from the merged second information may be physically the same means.

The other aspect of the present invention is an information processing system which collects and outputs information. The information processing system is an autopoietic information processing system which includes: a means that inputs first information; a means that collects second information related to the first information; a means that selects third information highly related to the first information from the second information based on a first rule; a means that selects fourth information from the second information based on a second rule different from the first rule; and a means that recursively collects new second information by setting the third or fourth information to new first information. The third information and the fourth information are recursed to the first information at a predetermined rate.

The other aspect of the present invention is an autopoietic information processing method. The autopoietic information processing method is an information processing method for collecting and outputting information and includes: a step that inputs first information; a step that collects second information related to the first information; a step that selects third information from the second information based on a first rule; a step that selects fourth information from the second information based on a second rule different from the first rule; a step that collects new second information by setting the third or fourth information as new first information; a step that merges the existing second information and new second information at a predetermined rate; a step that selects new third information from the merged second information based on the first rule; and a step that selects new fourth information from the merged second information based on the second rule. The steps are recursively performed.

By deriving information by such different laws and rules and recursively collecting information, results with possibilities and unexpectedness can be derived.

The above-described each information includes queries with respect to a database or a search engine and events with respect to time series data. In addition, during operating the above-described system or during or after performing the method, a user can easily understand a state of processing by causing a display device to display these information.

Advantageous Effects of Invention

According to the present invention, contents of collected information is continuously updated in response to an input by a user, and derivative and progressive information which is not initially expected by a user can be continuously provided.

An issue, a configuration, and an effect other than the above will clarified by descriptions of the following embodiments.

DESCRIPTION OF EMBODIMENTS

Embodiments according to the present invention will be described below with reference to the drawings. However, the present invention is not limitedly interpreted to the described contents in the embodiments to be described below. It is easily understood by a person skilled in the art that a specific configuration can be changed within a range of a thought or a gist of the present invention.

In a configuration of the present invention to be described below, the same reference signs are commonly used in different drawings for same portions or portions having similar functions, and an overlapped description will be omitted.

In the present description, "first", "second", and "third" are used to identify configuration elements and do not necessarily mean a number or an order. A number to identify the configuration elements is used in each context, and a number used in one context does not necessarily indicate the same configuration in the other context. Further, it is not necessarily prevented that a configuration element identified by one number has a function of a configuration element identified by the other number.

First Embodiment

Figure 1:
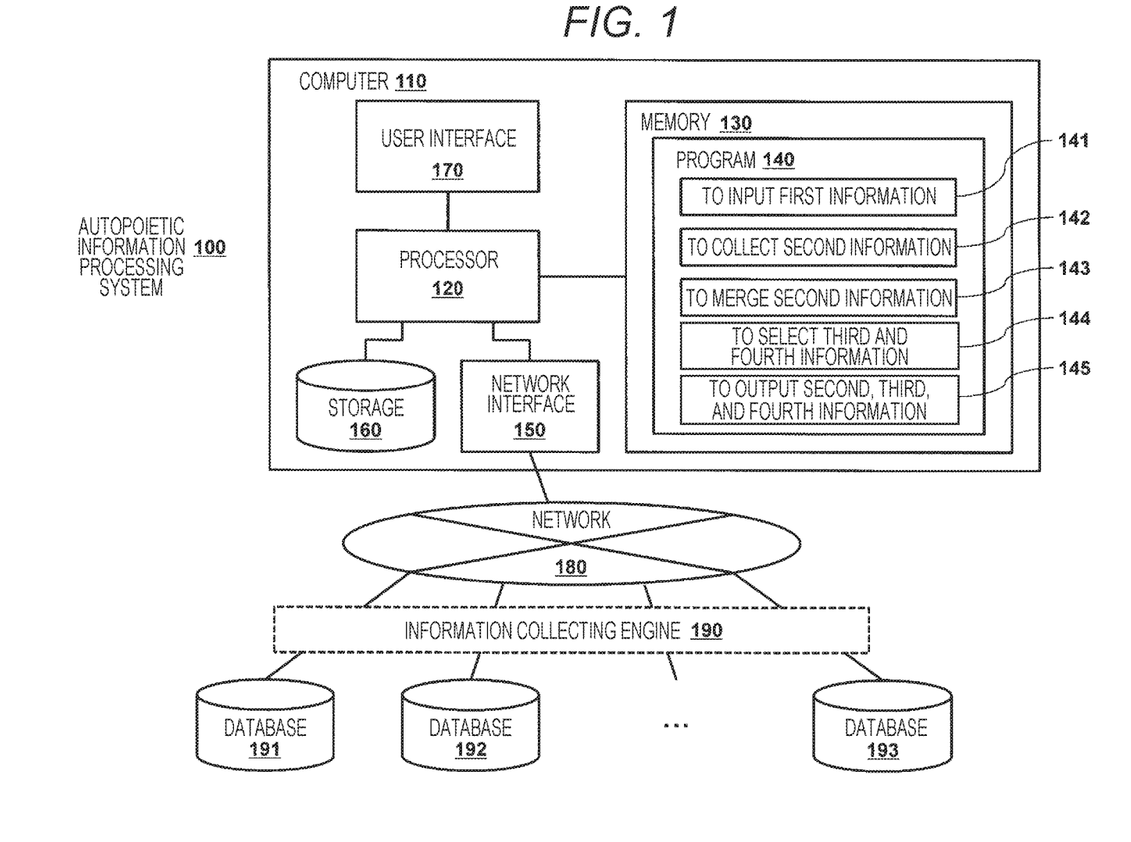
FIG. 1 is a configuration diagram of an autopoietic information processing system according to a first embodiment of the present invention.

FIG. 1 is a configuration diagram of an autopoietic information processing system according to a first embodiment of the present invention. An autopoietic information processing system 100 includes a computer 110, a network 180, and databases 191 to 193.

The computer 110 includes a processor 120, a memory 130, a network interface 150, a storage 160, and a user interface 170. The memory 130 includes a program 140 to cause the computer 110 (the processor 120) to perform information processing and includes a program 141 to input first information, a program 142 to collect second information, a program 143 to merge second information, a program 144 to select third or fourth information, and a program 145 to output second, third, or fourth information.

The computer 110, in accordance with the program 140, receives an input from the user interface 170, collects information from the databases 191 to 193 via the network interface 150 and the network 180, stores the information in the memory 130 or the storage 160, merges and selects the information, and outputs the merged and selected information to the user interface 170.

In the above-described configuration, a single computer 110 may be included, or an arbitrary portion may be formed by all of or a part of the other computer connected by a network. However, the above-described configuration is equivalent to ideas of the invention and does not change.

Other than a general database system, examples of the databases 191 to 193 include information sources such as the internet, a social media, a sensor network. The database engine may include an information collecting engine 190 such as a database engine and a search engine.

Figure 2:
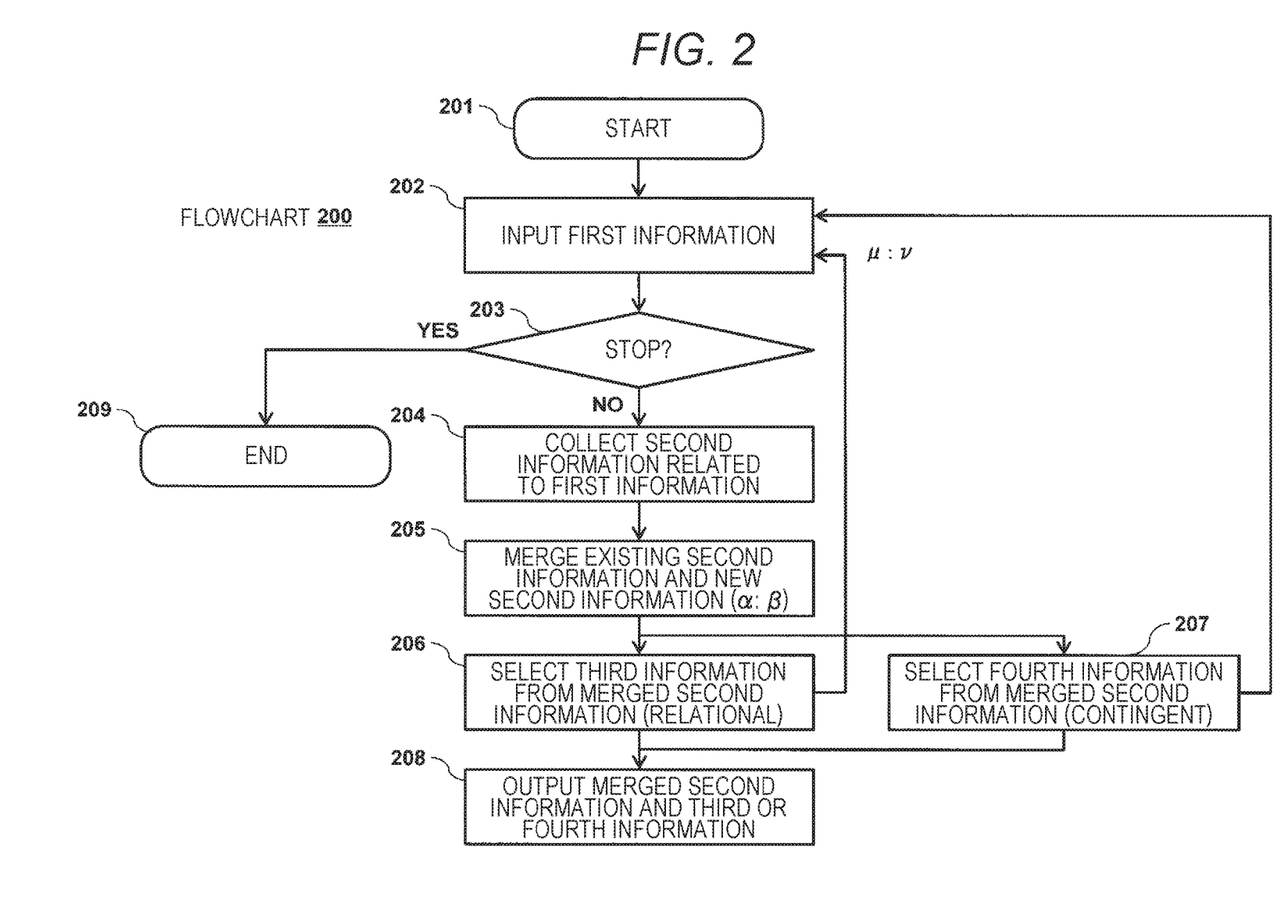
FIG. 2 is a flowchart describing an autopoietic information processing process according to the first embodiment.

FIG. 2 is a flowchart describing an autopoietic information processing process according to the first embodiment. A flowchart 200 starts from step 201, and first information is input to the user interface 170 by the program 141 in step 202. The first information includes queries to, for example, databases and a search engine and events with respect to time series data and may include information on other operations and displays. If first information indicates a stop in step 203, the processing is moved to step 209 and finished. If not, the processing is moved to step 204.

In step 204, second information related to first information is collected from databases 191 to 193 by the program 142. The second information includes a data structure including a graph, a table, a list, for example, in accordance with an application. In the case where step 204 is performed for the first time, the second information collected in step 204 is shifted from step 205 to steps 206 and 207.

In step 206, third information highly important to and related to the first information input by the program 144 is selected from the second information. If the second information is graph structure data, vertexes which are positioned near vertexes (objects and events) of the first information and in which weights of vertexes (importance) and weights of edges (relationship) are large is selected as third information. For example, in the other data structure, as described in PTL 1 and PTL 2, a data attribute and a query proposal highly related to the second information are selected. For example, evaluation items of an importance and a relationship are digitalized, and information having values equal to or larger than a predetermined threshold is specified, and third information is selected from the information. Alternatively, the digitalized evaluation items are sorted, a predetermined number of information is derived from a high order, and the third information may be selected from the derived information. Alternatively, simply one information having the highest value may be selected.

In step 207, fourth information is contingently selected from second information by the program 144. If the second information is graph structure data, vertexes of the fourth information are randomly selected from vertexes of the second information. Alternatively, vertexes of the fourth information are randomly selected after weighting by a distance from vertexes of first information to other vertexes. For example, if the second information has the other data structure, the fourth information is randomly selected from supplemental data attributes and query candidates. Further, a rule may be used in which the second information in an upper rank is selected as a fourth vertex after a fluctuation, a noise, and a shuffle are added to a rank of an importance and a relationship of vertexes of the second information.

The third or fourth information selected in steps 206 and 207 are recursed in step 202 and becomes an input of new first information. In step 204 through step 203, second information related to the new first information is collected. In step 205, the existing second information of the last time and the new second information of this time are merged at a predetermined rate ($\alpha:\beta$) by the program 143. If the second information is, for example, graph structure data, weights of vertexes and edges of the last time and this time are added at a predetermined rate. Specifically, the weights of vertexes and edges of the last time graph structure data is reduced according to the rate, and the weights of vertexes and edges of this time graph structure data is increased according to the rate. For example, in the case of other data structures, data in added data attributes and data by queries are added, and old data is deleted.

In steps 206 and 207 through step 205, the third or fourth information is again selected, and the information becomes first information when processing is returned in step 202. The second information is collected in step 204, second information of the last time and this time are merged in step 205, and the information are recursively circulated. Recursing from step 206 to step 202 and recursing from step 207 to step 202 are performed at a predetermined rate ($\mu:\nu$), and for example, relational selection and contingent selection are recursed one by one or at the same time in accordance with an application. First information may be input to the user interface 170 by interrupting in the middle of recursive circulation. The second information merged in step 205, the third and fourth information selected in steps 206 and 207 are output to the user interface 170 by the program 145 in step 208. New second, third, and fourth information are autopoietically generated and continuously output to the user interface 170 by the recursive circulation process in step 202 to steps 206 and 207.

Figure 3:
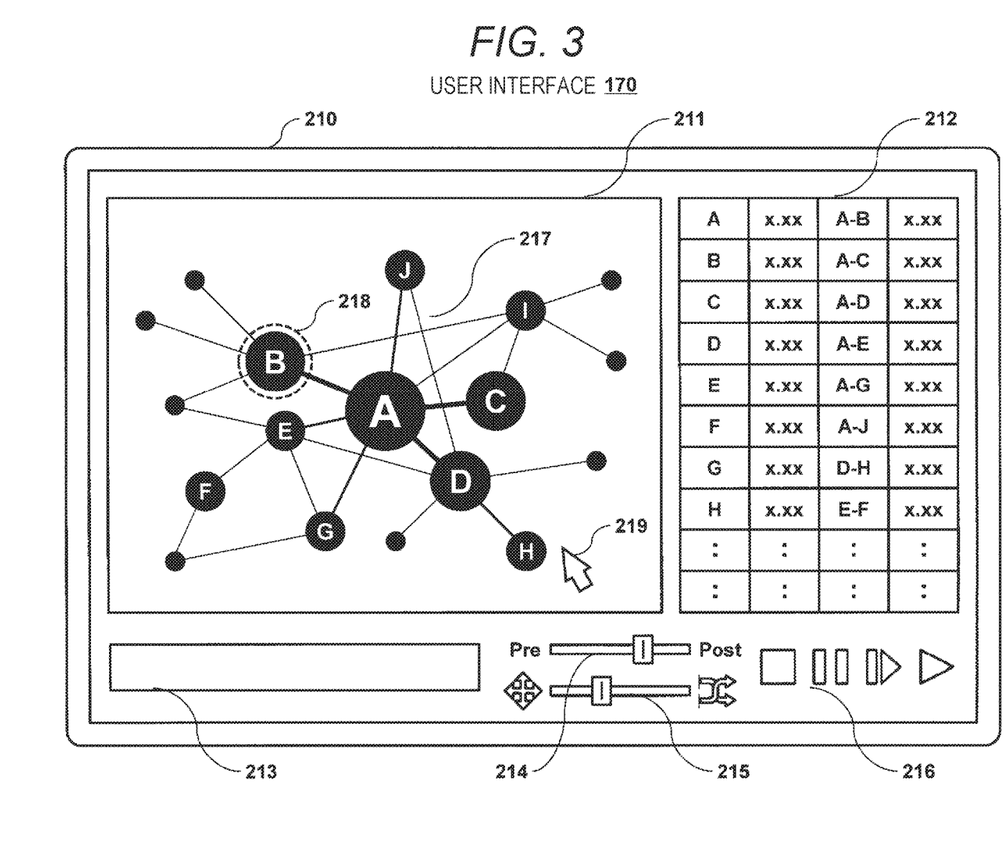
FIG. 3 is a configuration diagram of a user interface for performing an operation and a display according to the first embodiment.

FIG. 3 illustrates a user interface for performing an operation and a display according to the first embodiment. The user interface 170 includes information display windows 211 and 212, an input window 213, set sliders 214 and 215, and an operation button 216 in a display 210.

The information display windows 211 and 212 display second, third, or fourth information. If the second information is, for example, graph structure data, a graph 217 indicates weights of vertexes (such as A and B) by a size of a circle on the window 211 and indicates weights of edges (such as A-B and A-C) by the widths of lines, and the window 212 indicates weight values of the vertexes and the edges. The third or fourth information selected from the second information (for example, vertex B) is indicated by a dotted-line circle 218 on the graph 217 of the second information.

A user inputs the first information (such as queries and events), in other words, information collection conditions, on the input window 213. The first information can be input by inputting from the window 213 in the middle of information processing process and selecting a vertex 219 by using a pointer by a mouse operation. In this way, the interaction between a user and the information processing is provided.

Information processing conditions are set in the set sliders 214 and 215. In the slider 214, a merging rate of second information ($\alpha:\beta$) is set, and $\alpha$ is increased when a knob is slid to the left, and $\beta$ is increased when the knob is slid to the right. When $\alpha$ is increased, a ratio of the existing second information is increased. When $\beta$ is increased, a ratio of new second information is increased. The increase in the ratio of the new second information means that, for example, a portion to be replaced to new queries increases.

A recursing rate of third and fourth information ($\mu:\nu$) is set in the slider 215. When a knob is slid to the left, $\mu$ increases. When the knob is slid to the right, $\nu$ increases. When $\mu$ increases, a rate in which third information (relational) is selected is increased, and when $\nu$ increases, a rate in which fourth information (contingent) is selected is increased. When a rate in which the third information (relational) is selected is increased, it is expected that information related to information expected by a user can be easily collected. Further, when a rate in which the fourth information (contingent) is selected is increased, information unexpected by a user can be easily collected, and an unexpected result can be obtained.

A merging rate and a recursing rate can be changed in the middle of information processing, and an interaction with a user can be performed.

The operation button 216 operates an automatic execution, a frame feeding, a temporary stop, and a stop in the information processing process. When an automatic execution button is pressed, a recursive circulation of a process is continuously progressed. When a frame feeding button is pressed, a process indicated in the flowchart 200 moves forward one by one. When a temporary stop button is pressed, the process is temporarily stopped in the middle. When a stop button is pressed, the process is finished.

Figure 4:
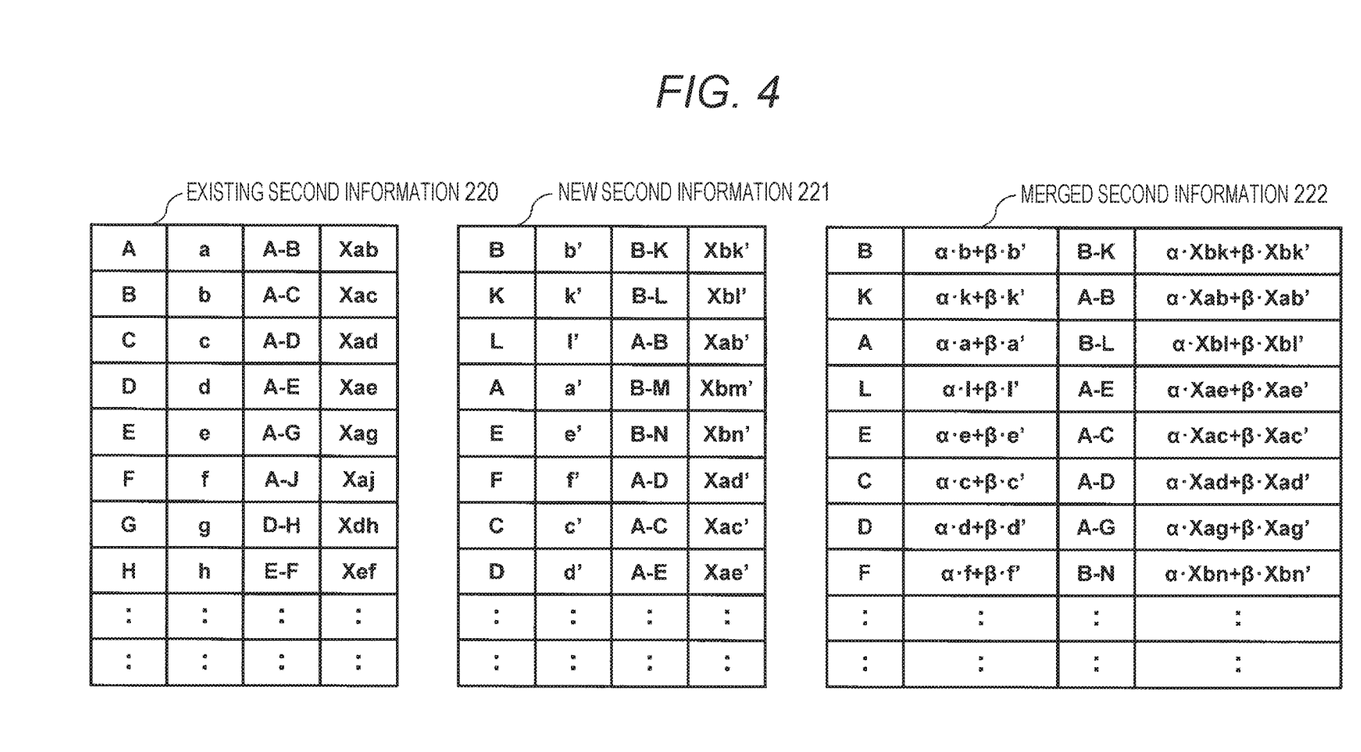
FIG. 4 is a table diagram illustrating an example of a merging processing of collected information according to the first embodiment.

FIG. 4 illustrates an example of a merging processing of collected information according to the first embodiment. In a recursive circulation process, merged second information 222 is calculated from existing last time second information 220 and new this time second information 221 collected by setting selected third or fourth information as first information. For example, a value of a vertex C, $\alpha \cdot c + \beta \cdot c'$, and a value of an edge A-C, $\alpha \cdot Xac + \beta \cdot Xac'$, of the merged second information 222 are obtained by adding, at a predetermined rate ($\alpha:\beta$), a value c of the vertex C and a value Xac of the edge A-C of the last time second information 220 and a value c' of the vertex C and a value Xac' of the edge A-C of this time second information 221. Since $\alpha$ and $\mu$ are integers or real numbers, $\beta=1-\alpha$ is established in the case of stochastic normalization.

Figure 5:
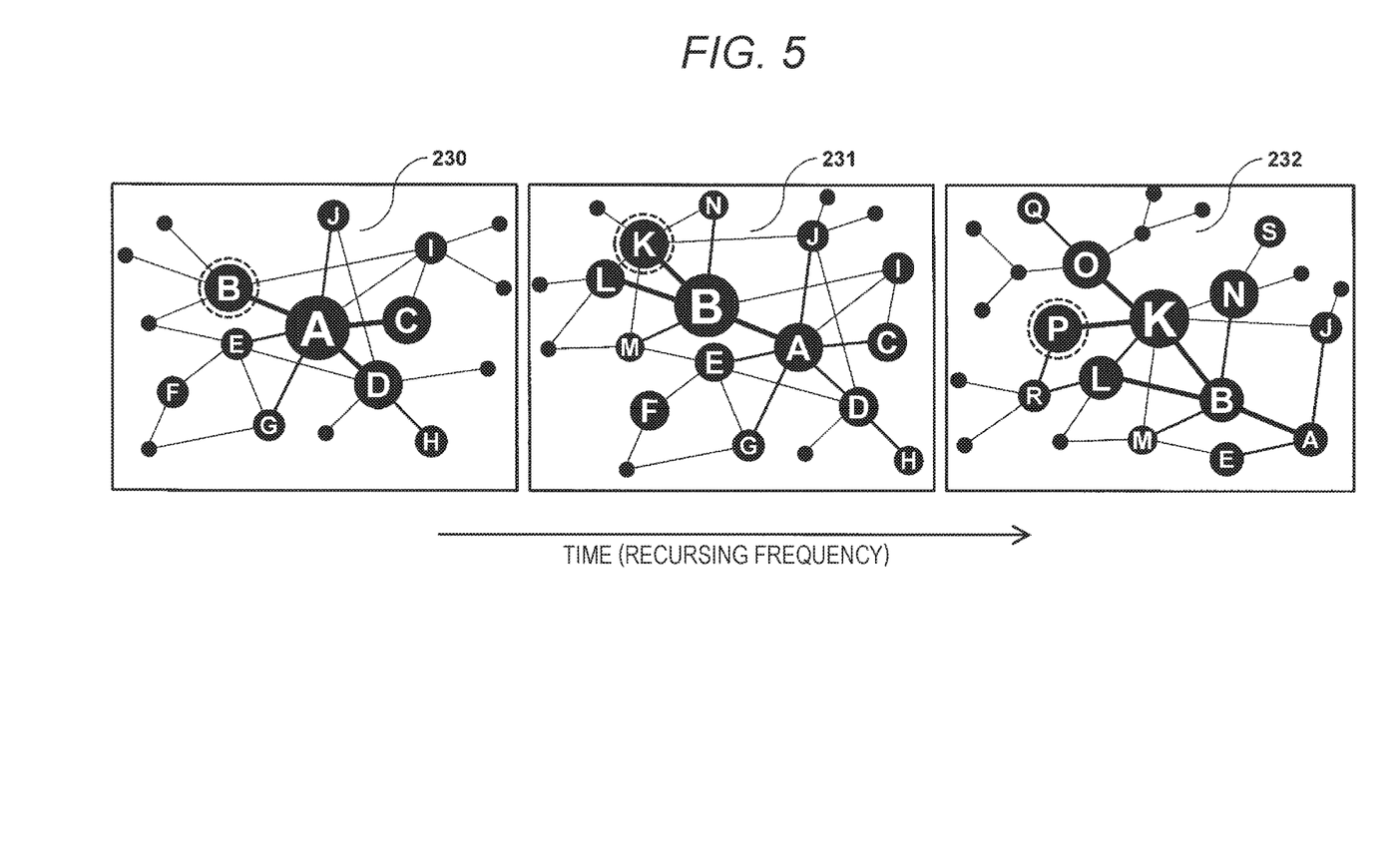
FIG. 5 is a conceptual diagram illustrating a display example of a user interface according to the first embodiment.

FIG. 5 illustrates a display example of a user interface according to the first embodiment. In association with an execution time of information processing, that is, a recursing frequency of a recursive circulation process, a display of the user interface is changed from a graph 230 to graphs 231 and 232. The graph 230 indicates a result in which second information is collected by setting a vertex A as first information, and a vertex B is selected as third or fourth information. A result that the vertex B is recursed, and the second information is collected by setting the vertex B as new first information is the graph 231, and a vertex K is selected. A result that the vertex K is recursed, and the second information is collected by setting the vertex K as new first information is the graph 232, and a vertex P is selected. A new graph is continuously displayed by this circulation.

According to the autopoietic information processing system in the first embodiment, new information can be continuously provided to a user via a recursive circulation process. Further, by selecting third or fourth information, relational (derivative) or contingent (progressive) information which has not been initially expected by a user leads to awareness and discovery by arousing user's intuition and creativity.

The system according to the first embodiment is an autopoietic system in aspect of that its own boundary (totality of information having a relationship) is changed with contingent becoming while maintaining the boundary and referring and selecting its own history (collected information). Merging processing of second information (a reduction in old information before recursing and an increase in new information after recursing) according to the first embodiment is related to obliteration and creation of memories. Recursing processing including third information (relationally selected) and fourth information (contingently selected) lead to a balance of an exploitation strategy and an exploration strategy in a decision-making process.

Since information processing is autonomously continuously performed in the first embodiment, a processing efficiency is improved in comparison with a case where the information processing is performed every time when a user inputs various information. In addition, merging processing of second information brings an effect that a memory capacity can be efficiently used in comparison with the case of continuously keeping old information and new information.

In the first embodiment, mainly graph structure data is exemplified and described. However, various graphs may be used such as a semantic network, a co-occurrence network, an event network, a social network, a stochastic process graph, and a discrete data graph. The graph is not limited to a non-directed graph and may be directed graph. As a database and an information source, in addition to a graph database, such as a relational database, an object database of NoSQL, and a key-value store are widely used.

In the first embodiment, information processing is automatically advanced. However, a function may be added which advances the information processing by changing a user input, a relational selection, a contingent selection by storing a log in a storage and rewinding once and performing the processing again in the middle. In the first embodiment, both of the relational selection and the contingent selection are included. However, according to an application, one of them may be included, and for example, a method may be used in which information is randomly selected within a highly related predetermined range.

In the first embodiment, old first information is updated to new first information, and old second information and new second information are merged. However, as another embodiment, a method can be considered in which second information is collected while adding the new first information to the old first information and deleting the old first information according to a recursing frequency (this may be merging processing different from the processing in the first embodiment from the other aspect). However, this method may be performed in consideration of a characteristic that contents (for example a graph shape) of second information are further changed discontinuously in comparison with the first embodiment.

Second Embodiment

Figure 6:
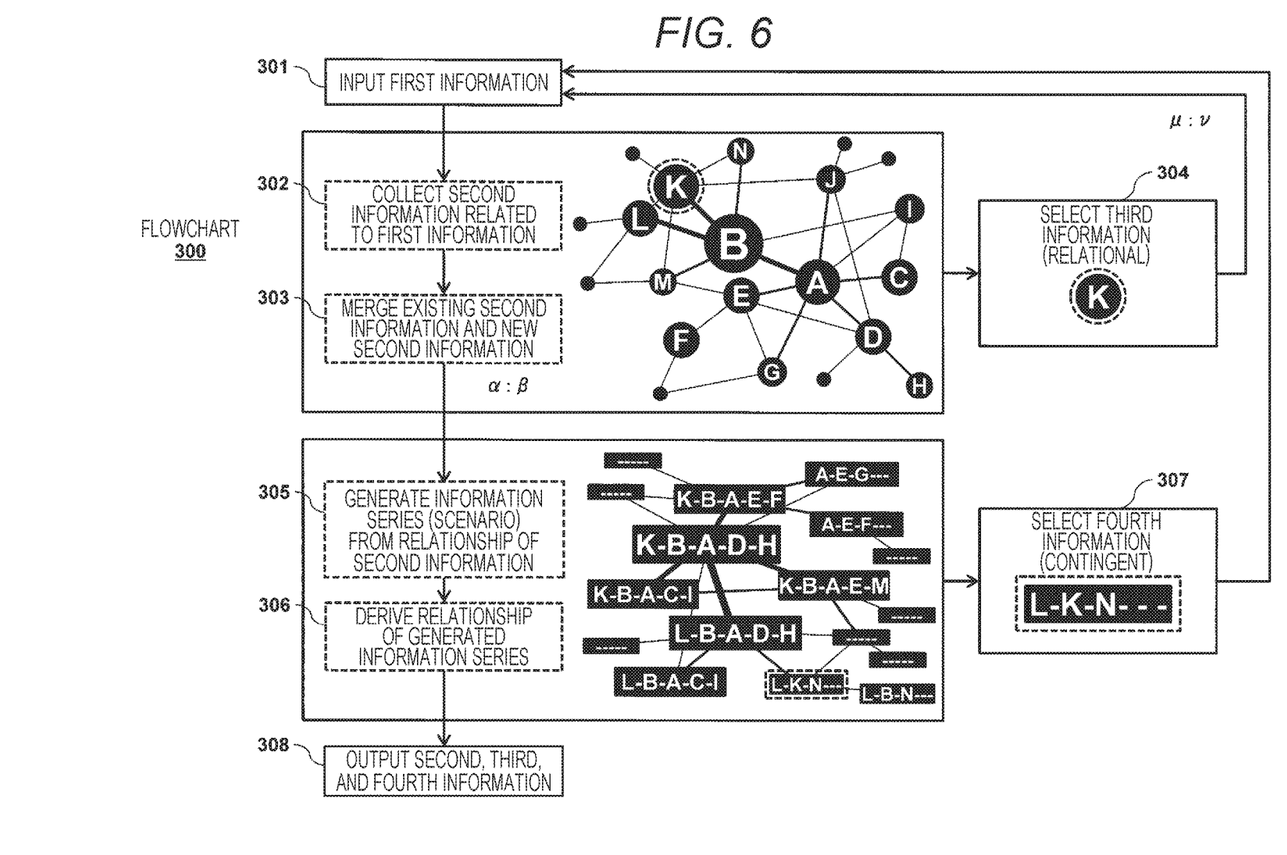
FIG. 6 is a flowchart describing an autopoietic information processing process according to a second embodiment.

FIG. 6 is a flowchart describing an autopoietic information processing process according to a second embodiment. In a flowchart 300, first information is input in step 301. In step 302, the second information related to the first information is collected. In step 303, existing second information and new second information are merged at a predetermined rate ($\alpha:\beta$) in reclusive circulation (for example, a graph including such as vertexes A and B and such as edges A-B and B-K connecting the vertexes). In step 304, third information highly related to first information is selected from second information (for example, a vertex K), and the selected information is recursed at a predetermined rate ($\rho$) to step 301 as new first information.

In step 305, an information series (for example, graph vertex series K-B-A-D-H and L-B-A-C-I) is generated from a relationship of second information. In step 306, a relationship of the generated information series (for example, weights of vertexes and edges in the case where K-B-A-D-H and L-B-A-C-I are vertexes) are derived. In step 307, fourth information is contingently selected from the information series (for example, L-K-N- the rest is omitted), and the fourth information is recursed at a predetermined rate ($\nu$) to step 301 as new first information.

In step 208, second, third, and fourth information are output (for example, a second information graph, the vertex K of the third information, a graph of the information series, and fourth information L-K-N- the rest is omitted). The second, third, and fourth information are autopoietically generated by recursing to step 301 through from step 302 to steps 303 and 304 and recursing to step 301 through from step 305 to steps 306 and 307, and the new information are continuously output in step 208.

Figure 7:
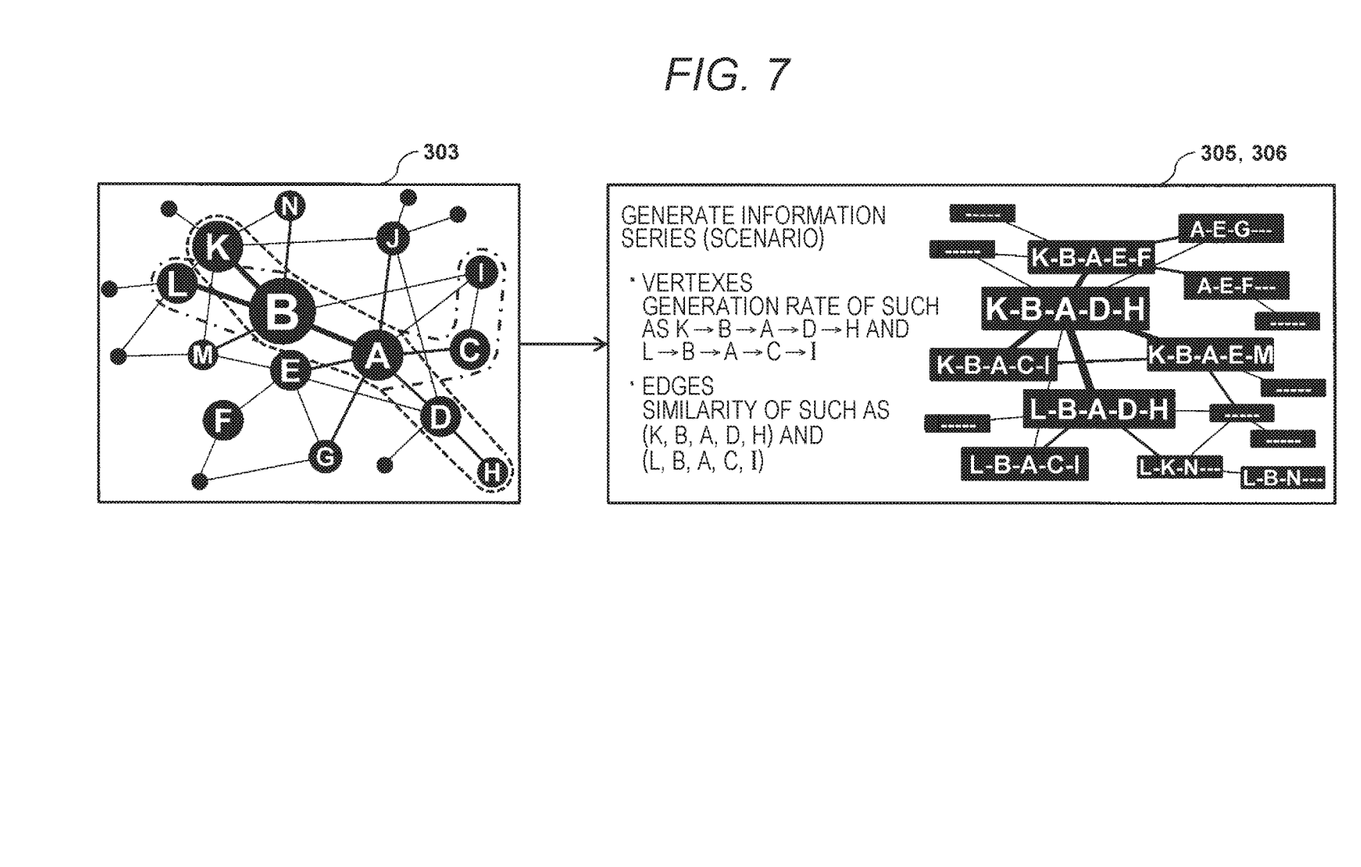
FIG. 7 is a conceptual diagram illustrating an example of generation processing of information series according to the second embodiment.

FIG. 7 illustrates an example of generation processing of information series according to the second embodiment. From the second information merged in step 303, vertex series such as K-B-A-D-H and L-B-A-C-I are generated in step 305. In step 306, a generation ratio of such as K-B-A-D-H and L-B-A-C-I is calculated and set to weights of vertexes, and a similarity of such as (K, B, A, D, H) and (L, B, A, C, I) is calculated and set to weights of edges. For example, a generation ratio of the information series K-B-A-D-H is calculated from a weight of the vertex K (occurrence probability) and weights of edges K-B, B-A, A-D, and D-H (transition probability), and a similarity of (K, B, A, D, H) and (L, B, A, C, I) is calculated from a cosine similarity, the Pearson correlation coefficient, the Jaccard coefficient, or the like.

According to the autopoietic information processing process in the second embodiment, new information is continuously provided to a user via a recursive circulation process, and second information (source terms, thinking elements, and events) and information series (scenario, connection of thinking elements and events) can be provided together. In the second embodiment, to provide a generation ratio and a similarity of the information series, a user does not need to think combination of various information series from second information. Therefore, user convenience is improved, and a time needed to an interaction with a user is shortened, and information processing efficiency is improved.

A relational resource selection in response to a user input is a reflexive and analogical subconscious action, and contingent scenario selection is a speculative and heuristic conscious action generated from subconsciousness. By combining both of them, information balanced between an exploitation strategy and an exploration strategy can be provided to a user.

A user, in other words, a human, records a short term memory and detects a causal relationship by a meaningful block of information, that size is a magical number 7±2. Therefore, in the second embodiment, a size of the information series is set to 5. However, the other size may be used. In addition, the information series is scenarios of thought and events. Therefore, an information series of fourth information can be indicated to a user via an automatic writing function.

Third Embodiment

Figure 8:
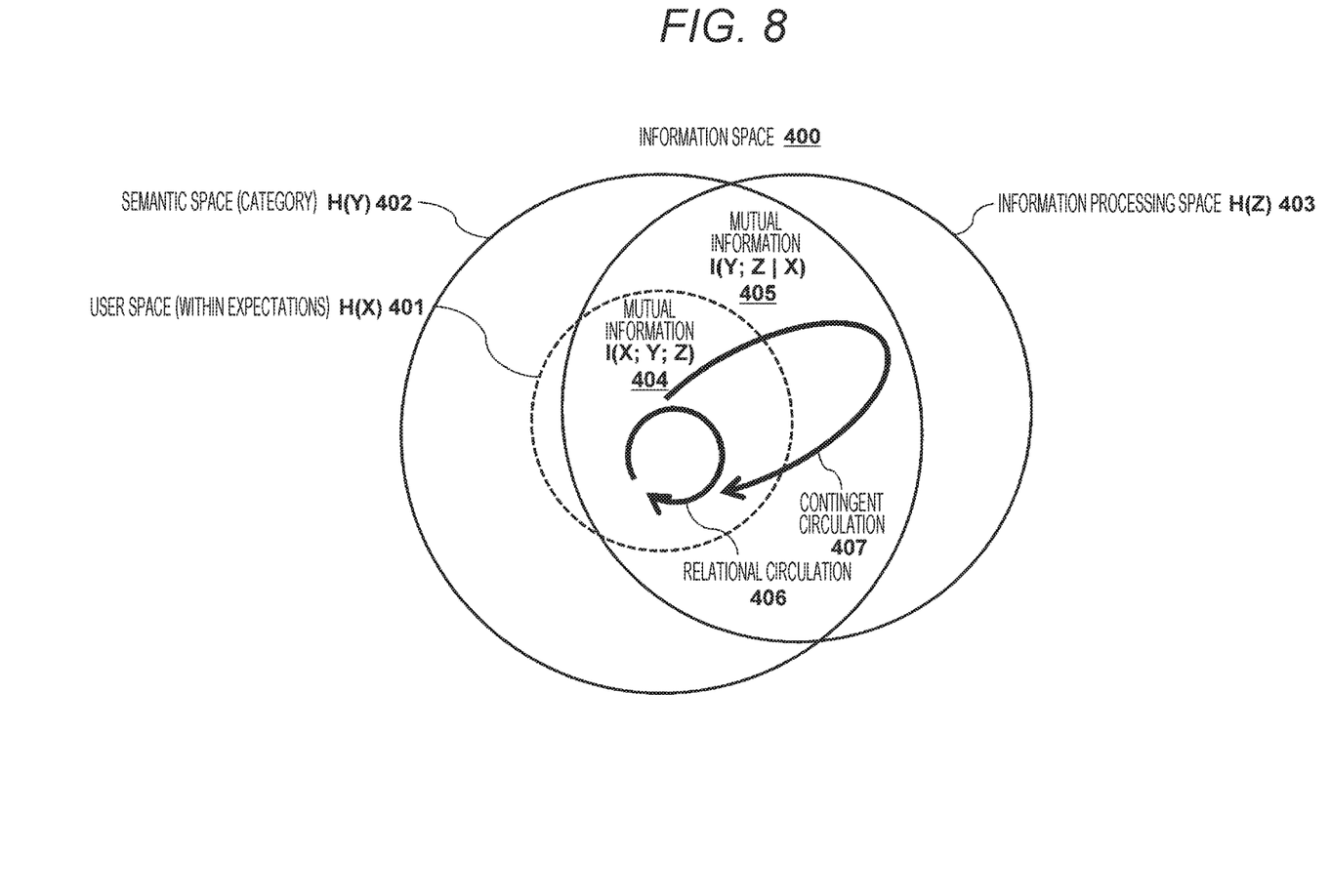
FIG. 8 is a Venn diagram illustrating an example of an autopoietic information processing viewed from an information space according to a third embodiment.

FIG. 8 illustrates an example of an autopoietic information processing viewed from an information space according to a third embodiment. In an information space 400, a range of information which would be initially expected by a user is considered as a user space 401. A category of information which would be meaningful to an interesting of a user is considered as a semantic space 402. A range of information to be indicated to a user by an autopoietic information processing is considered as an information processing space 403. Information entropies of the user space 401, the semantic space 402, and the information processing space 403 are denoted by H(X), H(Y), and H(Z) respectively.

In the autopoietic information processing, a circulation 406 which selects information highly related to a user input is a process in which information which would be included in the user space 401 is derived from the information processing space 403 and corresponds to an operation in a space expressed by mutual information I (X;Y;Z) 404. On the other hand, a circulation 407 which contingently selects information is a process in which information which would be not included in the user space (within expectations) 401 and would be included in the semantic space (category) 402 is derived from the information processing space 403 and corresponds to an operation in a space expressed by mutual information I (Y;Z|X) 405.

The information which is not included in the semantic space 402 is not worth to a user. Therefore, in the contingent circulation 407, information can be selected by setting the mutual information I (Y;Z|X) 405 as a weighting index. The mutual information works to pick related rare information, provides information which has not been initially expected by a user, and leads to awareness and discovery. For example, in the case where information search and document information are dealt, an index of such as tf-idf may be used instead of the mutual information. In the case where a category, a corpus, and a database are not set as the semantic space 402 in advance, a function may be included which gradually selects the semantic space through an interaction with a user.

In the embodiment, hardware and software configurations can be basically realized similar to the configurations illustrated in FIGS. 1 and 2. When fourth information described in FIGS. 1 and 2 is selected, the fourth information may be contingently selected by setting mutual information between a category regarding first information and second information as a weighting index.

Fourth Embodiment

Figure 9:
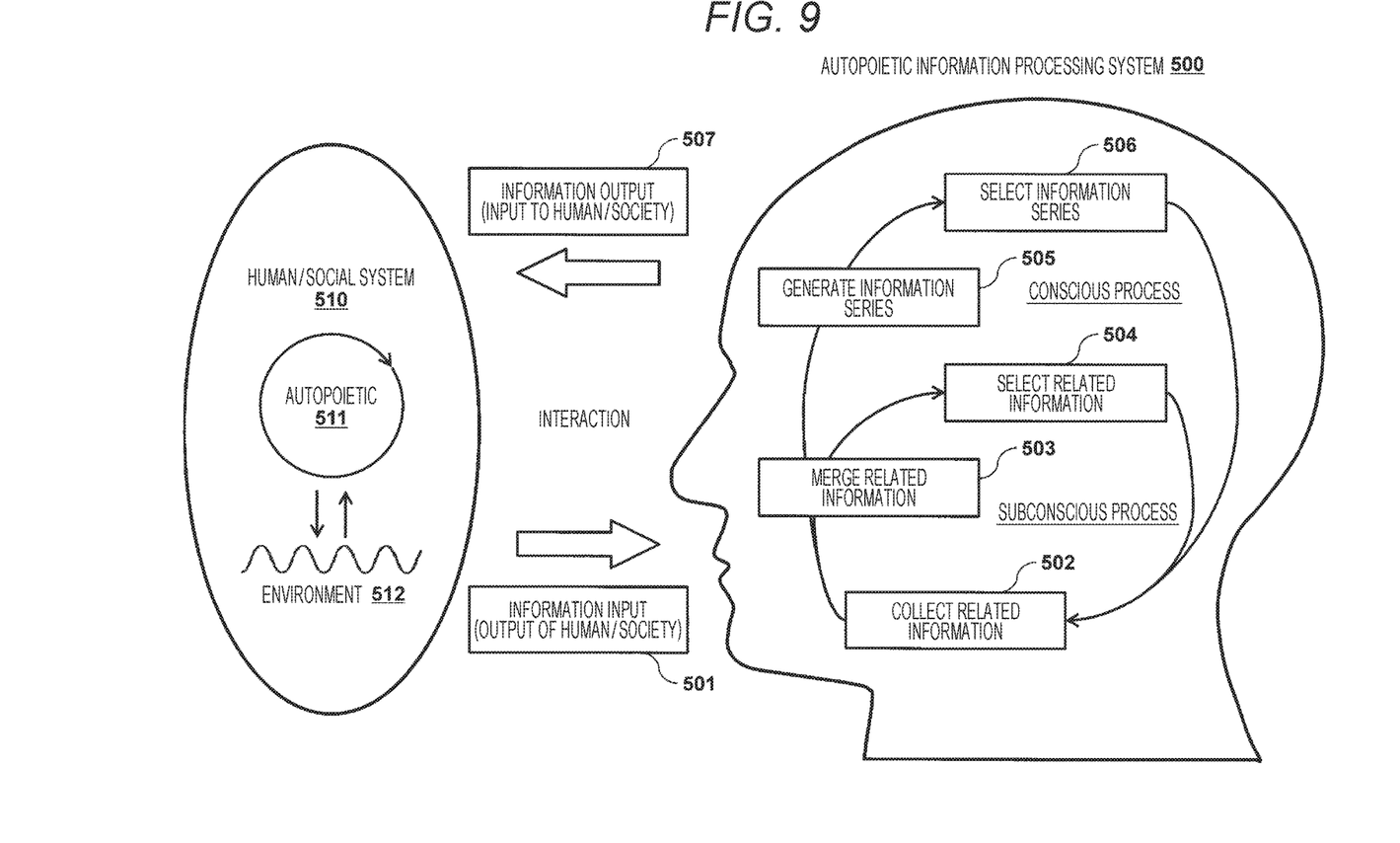
FIG. 9 is a conceptual configuration diagram of an autopoietic information processing system according to a fourth embodiment.

FIG. 9 is a conceptual configuration diagram of an autopoietic information processing system according to a fourth embodiment. An autopoietic information processing system 500 receives an information input (human and social output) 501 from a human and social system 510, outputs information (human and social input) 507 to the human and social system 510, and performs an interaction with a human and a society. A circulation of collection 502, merging 503, and selection 504 of related information which has been input 501 is considered as a subconscious process, a circulation of the collection 502, the merging 503, generation of information series 505, and selection 506 are considered as a conscious process, and consequently a subconsciousness and consciousness autopoietic system same as a human mind is formed. The information processing system 500 which realizes such a concept is realized by hardware and software represented in FIGS. 1 and 2 and realizes information processing similar to a mental activity of a human.

The human and social system 510 is an autopoietic system 511 which determines its own boundary by a recursive circulation while performing an interaction (structural coupling) with an environment 512. The information processing system 500 for the human and social system 510 is the environment 512. On the other hand, the human and social system 510 is an environment for the information processing system 500, and both of them continuously metamorphose its own boundary while performing a mutual interaction and can co-evolves. In aspects of the fourth embodiment, the present invention provides one embodiment of an information processing system having a mind and a consciousness.

Among the embodiments, a function similar to a function formed by software can be realized by hardware such as Field Programmable Gate Array (FPGA) and Application Specific Integrated Circuit (ASIC). Such embodiment is included within a range of the present invention.

The present invention is not limited to the above-described embodiments and includes various variations. For example, a configuration of an embodiment can be partially replaced with configurations of the other embodiments. Furthermore, a configuration of each embodiment can be added to configurations of the other embodiments. Further, a part of a configuration of each embodiment can be added to, deleted from, and replaced from other configurations.

INDUSTRIAL APPLICABILITY

The present invention is applicable to an information processing system and method for collecting and outputting information.

REFERENCE SIGNS LIST

100 autopoietic information processing system
110 computer
120 processor 130 memory
140 program
141 program to input first information
142 program to collect second information
143 program to merge second information
144 program to select third and fourth information
145 program to output second, third, or fourth information
150 network interface
160 storage
170 user interface
180 network
190 information collecting engine
191 to 193 database

The invention claimed is:

1. An autopoietic information processing system comprising:
   a user interface configured to receive first information; and
   a processor configured to collect second information related to the first information from a plurality of databases via a network interface, select third information from the second information, collect new second information by setting the third information as new first information, merge the second information and the new second information at a predetermined rate, and select new third information from the merged second information,
   wherein the new third information is recursively processed as the latest first information.

2. The autopoietic information processing system according to claim 1, wherein the processor is further configured to select the third information highly related to the first information from the second information and recursively process the selected information as the new first information.

3. The autopoietic information processing system according to claim 1, wherein the processor is further configured to contingently select the third information from the second information and recursively process the selected information as the new first information.

4. The autopoietic information processing system according to claim 1, wherein the second information is graph structure data, and the first information and the third information are data specifying vertexes of a graph.

5. The autopoietic information processing system according to claim 4, wherein a vertex which is positioned near a vertex of the first information and in which weights of a vertex and an edge are large are selected from the graph of the second information as the third information, and the selected vertex is recursed as a vertex of the new first information.

6. The autopoietic information processing system according to claim 4, wherein the processor is further configured to randomly select a vertex of the third information from vertexes of the graph of the second information and recursively process the selected vertex as a vertex of the new first information.

7. The autopoietic information processing system according to claim 4, wherein the processor is further configured to randomly select a vertex of the third information after weighting by a distance from the vertex of the first information to other vertexes from vertexes of a graph of the second information and recursively process the selected vertex as a vertex of the new first information.

8. The autopoietic information processing system according to claim 4, wherein weights of a vertex and an edge of the graph of the existing second information and weights of a vertex and an edge of the graph of the new second information are added at a predetermined merging rate.

9. The autopoietic information processing system according to claim 1, wherein the first information and the third information are queries with respect to said plurality of databases or a search engine.

10. The autopoietic information processing system according to claim 1, wherein the first information and the third information are events with respect to time series data.

11. An autopoietic information processing system comprising:
    a user interface configured to receive first information; and
    a processor configured to collect second information related to the first information from a plurality of databases via a network interface, select third information highly related to the first information from the second information based on a first rule, select fourth information from the second information based on a second rule different from the first rule, and recursively collect new second information by setting the third or fourth information as new first information,
    wherein the third and fourth information are recursively processed as the first information at a predetermined rate.

12. The autopoietic information processing system according to claim 11, wherein the processor is further configured to merge the existing second information and the new second information at a predetermined rate, and
    wherein the processor is further configured to select the third information and the fourth information from the merged second information.

13. The autopoietic information processing system according to claim 11, wherein the processor is further configured to generate information series from a relationship of the collected second information, derive a relationship of the information series, and contingently select fourth information from the information series.

14. The autopoietic information processing system according to claim 11, wherein the processor is further configured to contingently select fourth information by using mutual information between a category regarding first information and second information as a weighting index.

15. An autopoietic information processing method comprising:
    a step that inputs first information;
    a step that collects second information related to the first information;
    a step that selects third information from the second information based on a first rule;
    a step that selects fourth information from the second information based on a second rule different from the first rule;
    a step that collects new second information by setting the third or fourth information as new first information;
    a step that merges the existing second information and the new second information at a predetermined rate;
    a step that selects new third information from the merged second information based on the first rule; and
    a step that selects new fourth information from the merged second information based on the second rule,
    wherein the steps are recursively performed.

* * * * *